April 2, 1940.  F. M. CARROLL  2,195,848
VOTING MACHINE
Filed July 8, 1937  10 Sheets-Sheet 1

FIG. 1.

INVENTOR.
FRED M. CARROLL
BY
J. W. Lounsbury
ATTORNEY

FIG. 2.

INVENTOR.
FRED M. CARROLL
BY F. W. Lomnitzer
ATTORNEY.

FIG. 3.

INVENTOR.
FRED M. CARROLL
BY F. W. Lomnitzer
ATTORNEY

April 2, 1940.   F. M. CARROLL   2,195,848
VOTING MACHINE
Filed July 8, 1937   10 Sheets-Sheet 6

INVENTOR.
FRED M. CARROLL
BY J. W. Lownitzer
ATTORNEY.

April 2, 1940.  F. M. CARROLL  2,195,848
VOTING MACHINE
Filed July 8, 1937   10 Sheets-Sheet 7

INVENTOR.
FRED M. CARROLL
BY *J. W. Lomnitzer*
ATTORNEY.

April 2, 1940.     F. M. CARROLL     2,195,848
VOTING MACHINE
Filed July 8, 1937      10 Sheets-Sheet 8

INVENTOR.
FRED M. CARROLL
BY J. W. Lowritzer
ATTORNEY.

April 2, 1940.    F. M. CARROLL    2,195,848
VOTING MACHINE
Filed July 8, 1937    10 Sheets-Sheet 9

INVENTOR.
FRED M. CARROLL
BY
J. W. Lomnitzer
ATTORNEY

April 2, 1940.                F. M. CARROLL                    2,195,848
                              VOTING MACHINE
                        Filed July 8, 1937        10 Sheets-Sheet 10

INVENTOR
FRED M. CARROLL
BY
J. W. Lomnitzer
ATTORNEY

Patented Apr. 2, 1940

2,195,848

UNITED STATES PATENT OFFICE 2,195,848

VOTING MACHINE

Fred M. Carroll, Binghamton, N. Y., assignor to International Business Machines Corporation, New York, N. Y., a corporation of New York Application July 8, 1937, Serial No. 152,558

7 Claims. (Cl. 235—50)

This invention relates to voting machines and more particularly to voting machines for recording votes in accordance with the system of proportional representation voting.

In proportional representation systems the voter selects a number of candiates as his choices for a particular office and indicates the order of preference. This has heretofore been done by marking by hand on a prepared ballot and in order to determine from such ballots which candidates have been elected it has been necessary to engage in laborious and time-consuming classifying and counting operations with resultant delay in informing the public of the results.

It is accordingly the principal object of the present invention to devise an automatic mechanical ballot preparing and marking machine which will record each voter's preferences on a card or record suitable for handling by high speed mechanical and electrical sorting and counting machines whose rapidity of operation will enable the results to be known in a minimum space of time.

Present forms of voting machines are not suitable nor adaptable for the performance of the required functions and an entirely new form of mechanism has accordingly been devised. It comprises, generally, the usual curtained booth into which the voter steps and draws the curtain behind him.

Within the booth is a series of dials, all alike, each having printed around its periphery the names of all the candidates. These names are visible through a suitable window and the voter turns the dial until the name of his choice appears at the window. The dials are numbered from 1 to 30 in the present embodiment and, if the voter's first choice for the office is "Jones," he turns dial No. 1 until the name "Jones" appears. If his second choice is "Smith," he turns dial No. 2 until the name "Smith" appears, and so on, setting as many dials in order as he desires.

Below and in front of the dials is a shelf through an opening in which is visible the record material which is to form the voter's ballot. On this material the voter may "write in" the name of any one whose name is not on the regular candidate dials.

In leaving the booth the voter draws the curtain aside by operating the usual curtain lever which sets in motion mechanism which senses the setting of the dials and automatically records on the ballot by means of marks the various selections previously made and then resets the machine to normal or home position.

The ballot or record material is drawn from a reel to the recording position from which, after a vote is recorded, it is further advanced and a section cut therefrom containing the recorded choices of a single voter. This ballot is preprinted with lines delineating as many fields as there are possible choices. Each field has two columns, a tens and a units column each with ten marking positions. Thus, if a voter's first choice is "Jones" whose number is fourteen, the first field will be marked in the "1" position of the tens column and in the "4" position of the units column.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

Figure 1:
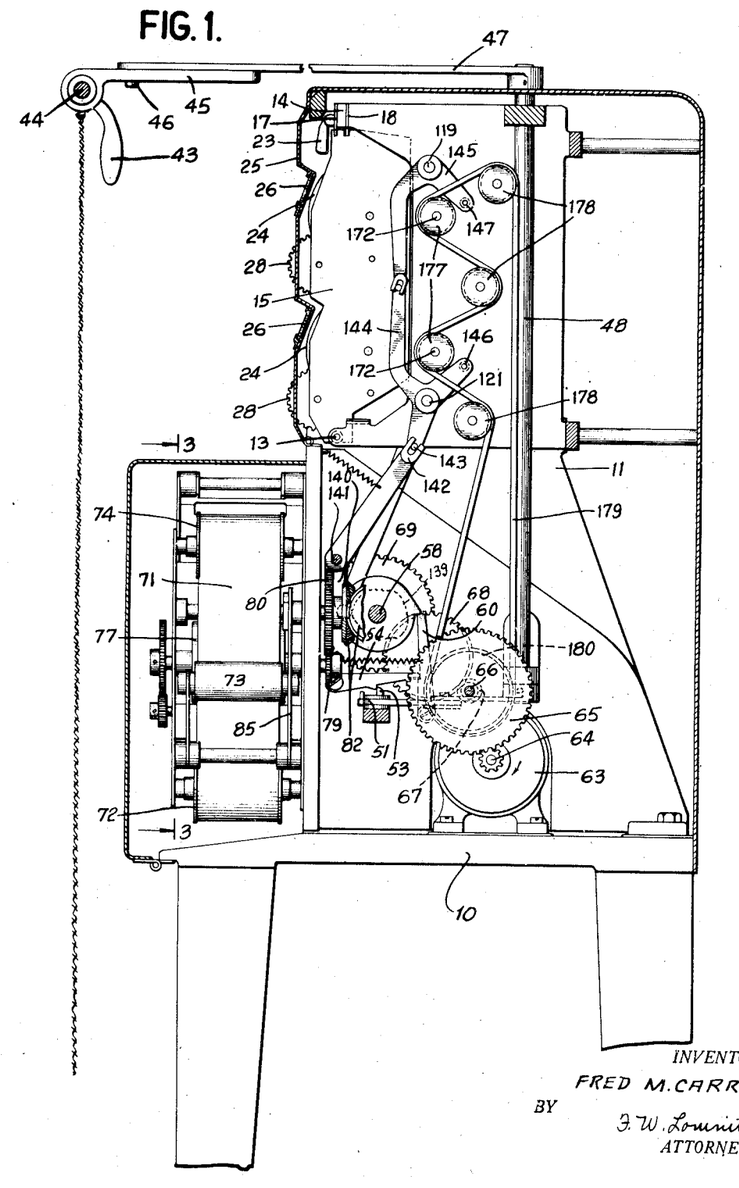
Fig. 1 is a side view of the machine with the outer casing removed.
Figure 2:
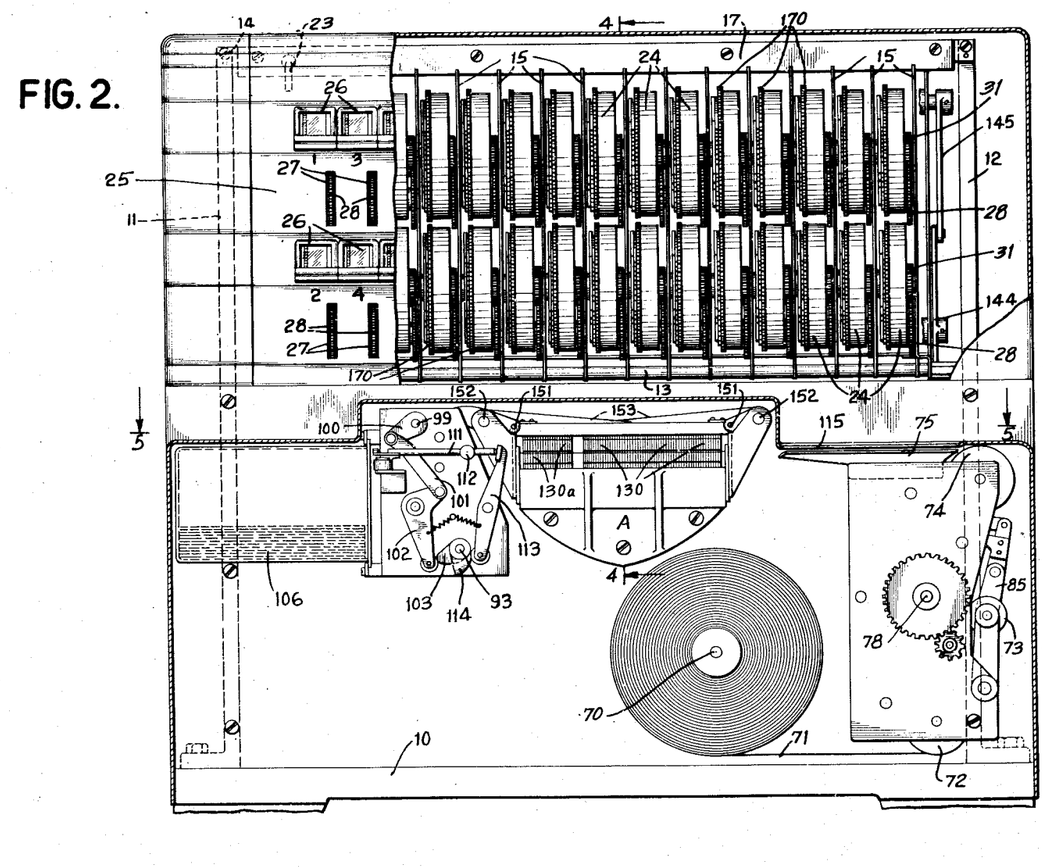
Fig. 2 is a front view of the machine with the casing broken away to show the interior construction.

The machine of Fig. 2 comprises a candidate selecting section extending across the upper part of the machine, which has thirty manually operable wheels to provide thirty choices for the voter. Below and in front of the candidate wheels is the ballot feeding, marking, and severing mechanism provided with a station for the writing in of names of candidates which do not appear on the wheels. Across the front of the machine is the usual curtain, as shown in Fig. 1.

Candidate selecting wheels

The arrangement of the candidate wheels and the manner in which they are operated to register the voter's selections will first be described.

Figure 4:
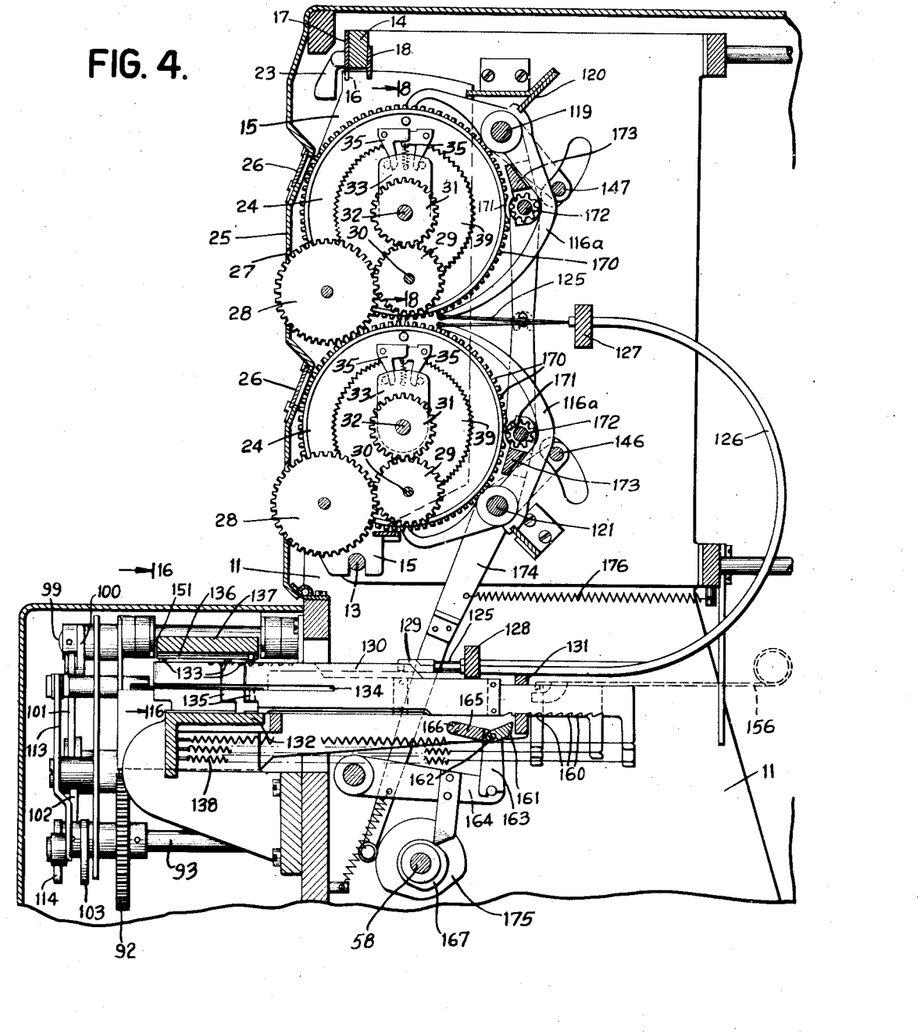
Fig. 4 is a section taken along the lines 4—4 of Fig. 2.
Figures 6, 7:
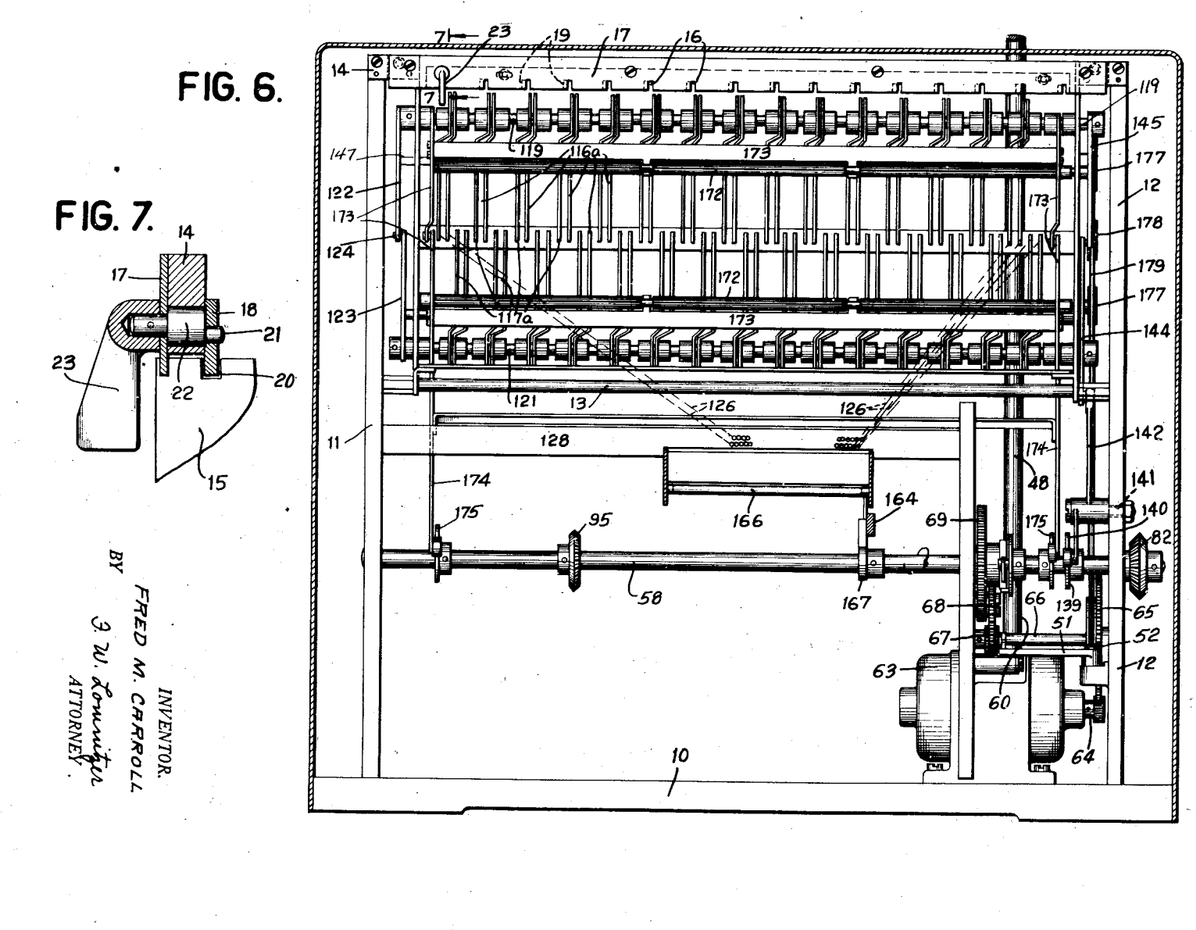
Fig. 6 is a section of the machine looking from the front.
Fig. 7 is a detail taken on lines 7—7 of Fig. 6.

Referring to Fig. 2, the base 10 of the machine supports side frames 11 and 12 between which there extends a rod 13 and a bar 14 (see also Fig. 4). Mounted along the length of the rod 13 are a number of candidate wheel supporting plates 15 which are provided at their lower ends with notches which straddle the rod 13. The upper ends of the plates 15 are supported and spaced by notches 16 in a plate 17 secured to bar 14 (see Fig. 7). Also mounted on bar 14 is a locking plate 18 provided with notches 19 and suitably mounted for horizontal movement. When the plates 15 are inserted in the machine, the notches 16 and 19 are in alinement so that the plate can readily be moved into position, after which locking plate 18 is moved laterally to shift its notch 19 to the left as viewed in Fig. 6 whereby the plate will engage in a notch 20 in the plate 15 and lock it in position. Shift of plate 18 is effected by a pin 21 mounted eccentrically in a stud 22 which is provided with a handle 23.

Each of the plates 15 supports a pair of candidate wheels 24 and in accordance with the requirements of the election more or less plates 15 may be placed in the machine as desired. Across the front of the candidate wheel section of the machine is a hinged cover 25 provided with windows 26 which are in line with the several wheels 24. The windows are consecutively numbered as indicated in Fig. 2 to represent the order of selection. The cover 25 is also provided with openings 27 through which gears 28 extend and which the voter manipulates to rotate the wheel to the position representing his choice for office.

Figure 8:
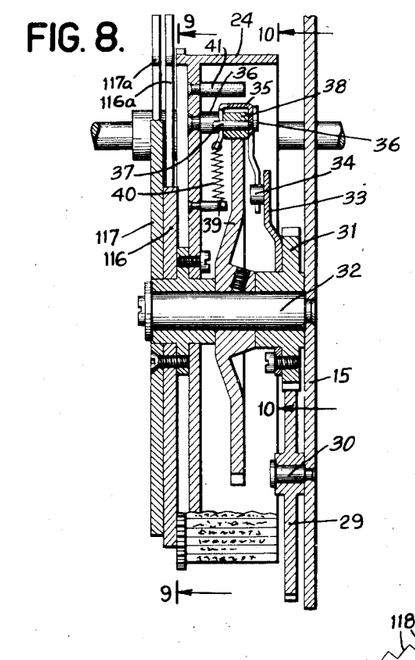
Fig. 8 is a section of one of the candidate wheels, the section being taken along the lines 8—8 of Fig. 4.
Figure 10:
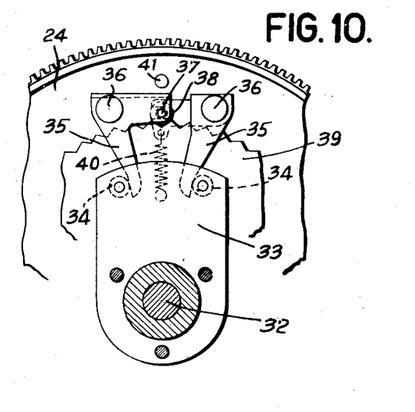
Fig. 10 is a section taken along the lines 10—10 of Fig. 8.

Referring now to Figs. 4 and 8, the gear 28, which is suitably supported on the plate 15, meshes with an idler gear 29 pivoted on plate 15 at 30 which, in turn, drives a gear 31 freely mounted on the stud 32. Secured to gear 31 is a plate 33 (see also Fig. 10) whose upper end carries a pair of pins 34. The pins 34 serve to rotate the candidate wheel 24 in either direction through a connection which includes a pair of bell crank-shaped members 35 pivoted to the wheel at 36. The members 35 have pin and slot connection 37 with one another and at their point of connection support a detenting roller 38 which normally cooperates with the teeth of detenting wheel 39 which is secured to the stud 32 and consequently remains in a stationary position. A spring 40 normally urges the roller 38 into engagement with the wheel 39, thus holding the candidate wheel 24 in position. As the plate 33 is moved in either direction, a pin 34 therein will rock its arm 35 to lift roller 38 out of engagement with the wheel 39 until the member is stopped by a pin 41. Upon release of the setting gear 28, the spring 40 will hold the candidate wheel 24 in its adjusted position. Wheels 24 are reset to their initial position by mechanism to be later described which rotates the wheels directly. When a wheel 24 is reset, the arms 35 operate in a reverse manner to lift roller 38 out of the notches in disc 39. That is, as the wheel is turned, carrying with it pivot 36, the free end of arm 35 is momentarily retarded by pin 34 so that the arm 35 is rocked about its pivot and removes roller 38 from the disc 39. Upon continued rotation of the wheel and when arm 35 abuts pin 41, plate 33 will be picked up and rotated with the wheel so that the whole assemblage is rotated with roller 38 in disengaged position. About the periphery of the candidate wheel are a number of names which, as the wheel is rotated, will pass the window 26 in succession. In operating the device, the voter will rotate the wheel 28 until the name he wishes to select appears at the window 26. As many wheels 24 are positioned by the voter as he desires.

Vote recording mechanism

After the voter has adjusted the various candidate wheels in accordance with his desires, he is ready to leave the voting booth by drawing aside the curtain by means of the usual curtain rod lever represented at 43 in Fig. 1. Operation of the lever 43 to draw aside the curtain sets in motion the mechanism for reading the setting of the candidate wheels as adjusted by the voter and causes recording of such selection on the ballot.

Figure 18:
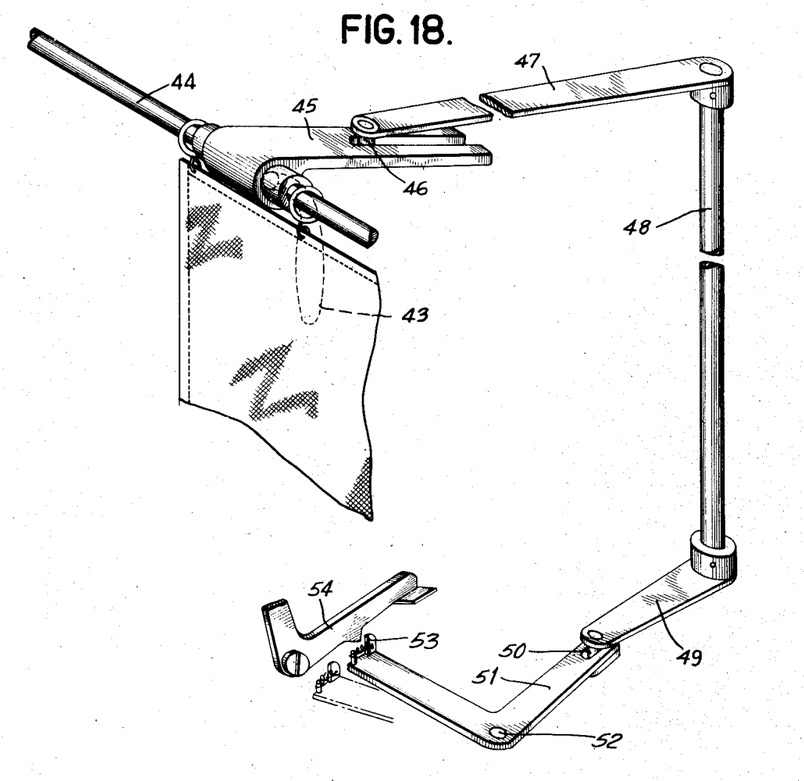
Fig. 18 is an isometric view showing the connections between the curtain operating lever and the main clutch of the machine.

Referring to Fig. 18, the lever 43 is slidably mounted on the usual front curtain supporting rod 44 and has a laterally extending arm 45 which in turn has pin and slot connection 46 with an arm 47 secured upon a vertical shaft 48. At its lower end the shaft 48 carries an arm 49 which, in turn, has pin and slot connection 50 with a bell crank lever 51 which is pivoted at 52 to side frame 12. At the extremity of one of its arms the bell crank 51 carries a spring-pressed pivoted by-pass latch 53 which, when the curtain is open, occupies the full line position shown in Fig. 18. When the voter enters the booth and closes the curtain behind him, the operation of the lever 43 will cause rocking of bell crank 51 to move the latch 53 to its dotted line position without disturbing the lever 54.

Figure 5:
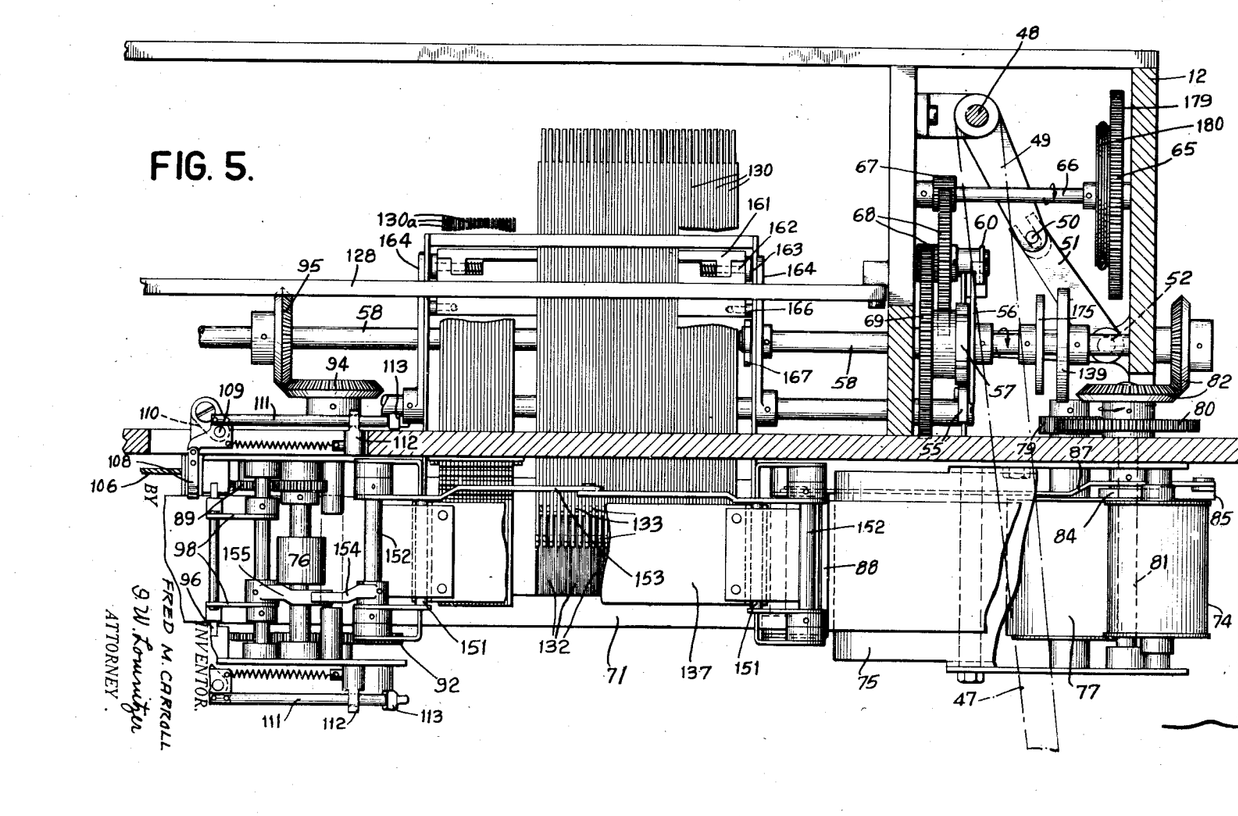
Fig. 5 is a plan elevation taken substantially along the lines 5—5 of Fig. 2.
Figure 14:
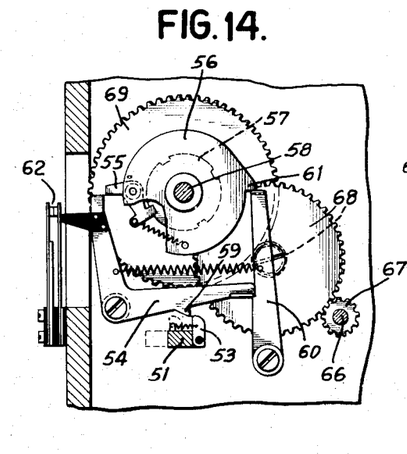
Fig. 14 is a detail of the main clutch operating mechanism.
Figure 15:
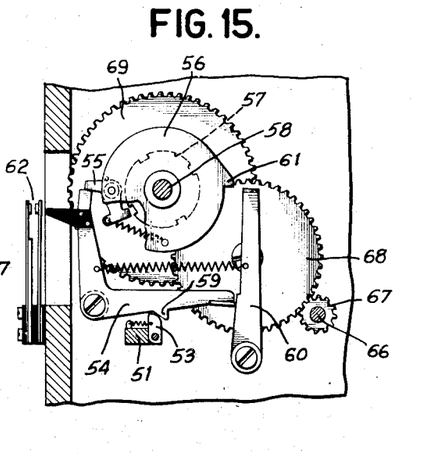
Fig. 15 is a view similar to Fig. 14 with the parts in a different position.

Referring to Fig. 15, the lever 54 normally holds the clutching dog 55 carried by a disk 56 out of engagement with clutch driving element 57 which is supported on shaft 58. With the opening of the curtain, latch 53 will move toward the right as viewed in Fig. 15 and through engagement with the camming tooth 59 on member 54 will rock the latter counterclockwise to the position shown in Fig. 14, causing release of dog 55 for engagement with clutch driving element 57. At the same time a latching arm 60 will engage and hold the member 54 in the position shown until the disk 56 has made a complete revolution at the end of which the camming projection 61 will rock latch 60 to release member 54. An extension of insulating material carried by member 54 causes closure of a pair of contacts 62. These contacts control the supply of current to motor 63 (Fig. 1) whose armature shaft 64 carries a pinion meshing with a gear 65 on shaft 66. At its other end, shaft 66 carries a pinion 67 (see Figs. 5 and 6) which, through gearing designated 68, drives gear 69 with which the clutch driving element 57 is integral. During the single rotation of shaft 58, a new ballot is moved into position, the voter's selections are read from the positioned wheel and recorded on the ballot, and the wheels are then cleared in readiness for the next voter to make his selections.

Figure 3:
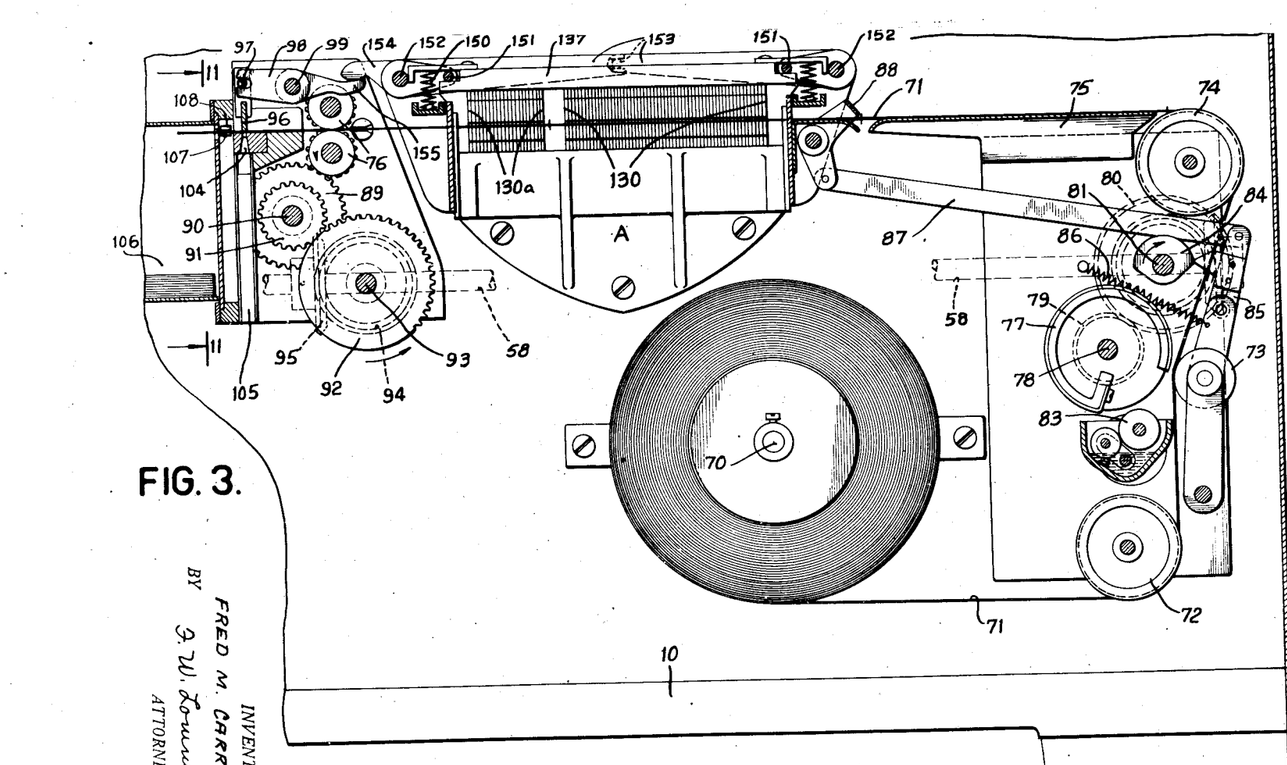
Fig. 3 is an enlarged view of the ballot feeding mechanism, the view being taken along the lines 3—3 of Fig. 1.
Figure 13:
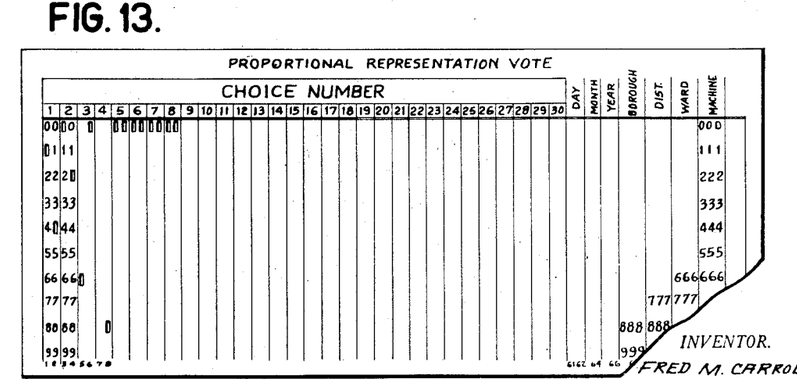
Fig. 13 is a view of one of the ballots.

Before explaining the manner in which the setting of the candidate wheels is entered on the ballot, the mechanism for feeding the same to the entry receiving position will first be described. The ballot material comprises a roll of blank paper or card stock which is placed on a spindle 70 (Fig. 3). From here the strip 71 is guided around a flanged roller 72, over a pressure roller 73, an upper guide roller 74, across a bed 75, through the recording section, to a pair of feeding rollers 76. Rotation of the rollers 76 will draw the strip along its path and advance it the proper amounts. Opposite the pressure roller 73 is a printing roller 77 mounted on a shaft 78 which carries a gear 79 meshing with a gear 80 (see also Fig. 5) carried by a shaft 81 whose extremity has bevel gear connection 82 with the main driving shaft 58. Thus, during the rotation of the shafts 58 and 78, the blank strip will be printed in accordance with the desired arrangement of the ballot, for example, as shown in Fig. 13. Suitable inking roller 83 is provided to ink the printing roller 77 as it rotates. The shaft 81 carries a cam 84 cooperating with a camming surface on member 85 which supports the pressure roller 73. As cam 84 rotates, the member 85 is released so that spring 86 may urge the roller 73 and the paper strip tightly against the printing roller 77. The upper extremity of member 85 is connected by means of a link 87 with a pivoted tensioning bail 88 which slightly cups the strip to take up the slack.

Figure 11:
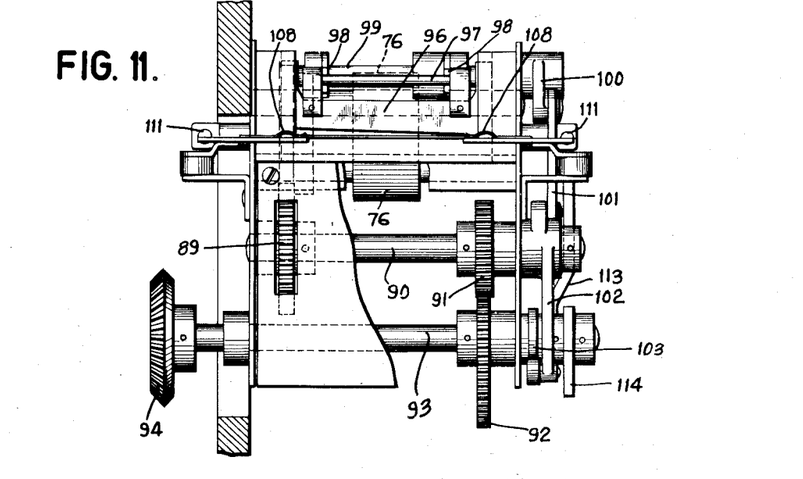
Fig. 11 is a section of the ballot severing mechanism, the section being taken along the lines 11—11 of Fig. 3.

The feed rollers 76 are geared together and are driven by a gear 89 (Fig. 3) mounted on a shaft 90 which also carries a gear 91 which cooperates with an intermittent gear 92 arranged with teeth on only half its circumference. The gearing is such that during the half revolution of gear 92 the rollers 76 advance the record strip a distance equal to the length of one ballot. Gear 92 is mounted on a shaft 93 whose extremity carries a bevel gear 94 meshing with a bevel 95 on the main driving shaft 58. To the left, or in advance, of the feed rollers 76, as viewed in Fig. 3, is positioned a knife 96 which is suitably mounted for vertical reciprocation (see also Fig. 11). Connected to the knife, as by pin and slot connection, are arms 98 secured to a cross rod 99. In Fig. 2, the rod 99 carries an arm 100 which has link connection 101 with a bell crank follower arm 102 cooperating with a cam 103 mounted on shaft 93. As the cam rotates, the knife 96 is forced downwardly to cut out a thin transverse section of the ballot strip between adjacent ballots, this strip passes through the die portion 104 to a chute 105 through which it is guided to a suitable receptacle (not shown).

The severed ballot is of the required length and passes to a box or receptacle 106 (Fig. 2). The box 106 is completely closed except for an opening 107 through which the ballots enter the box. Before entering the opening 107, they pass by a pair of spring clips 108 (see Figs. 5 and 11).

Clips 108 are pivoted at 109 to arm 110 and have secured thereto a rod 111 which extends through a fixed bearing 112. The free end of rod 111 abuts against an arm 113 whose opposite end carries a roller cooperating with cam 114 on shaft 93 (see Fig. 2). As the cam rotates, rod 111 is moved toward the left after the knife has severed the ballot and the clips 108 engage against the edges of the ballot and urge the severed ballot into the receptacle 106.

In Fig. 3, the ballot strip 71 is shown in position ready for operation with the leading portion engaged by the feed rollers 76. It will, of course, be understood that in commencing operation there is a waste portion at the left end and the first effective ballot portion is positioned over the plate 75. In Fig. 3, the strip 71 is crossed by short vertical lines to indicate the limits of the successive ballots. When a voter enters the voting booth, the ballot, which is to receive selections, is in position over the plate 75 and is accessible through a suitable opening 115 (Fig. 2) through which he may record with a writing instrument the name of any candidate which does not appear on the regular candidate wheels. This is the so-called "write-in" position and the writing will appear on the back of the ballot since, as observed in Fig. 3, the printing wheel 77 will effect printing on the under face of the strip 71 as it passes toward the feed rollers 76. When the voter leaves the booth, the incidental operation of the curtain lever 43 will, as explained, initiate a cycle of operations of the main drive shaft 58, and, during such rotation, the section of the strip 71 will be advanced a ballot's length to present the ballot to the marking devices generally designated A and which are yet to be described, at the same time bringing the next section to the station 75 in readiness for the next voter.

When the second voter leaves the booth, the first ballot advances to a position to receive certain indicia common to all ballots.

Figure 12:
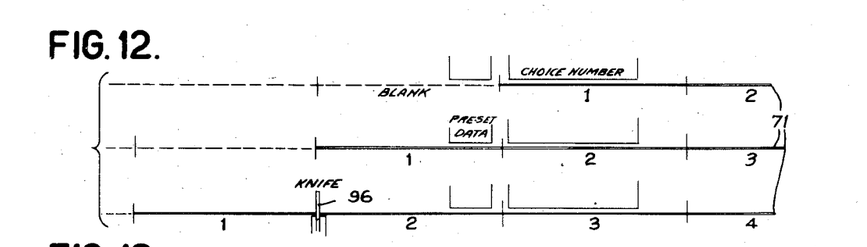
Fig. 12 is a diagram showing the movement of the ballots through the machine.

Fig. 12 shows the successive positions of the ballots during successive operations of the machine, and Fig. 13 shows the arrangement of the ballot. On the uppermost line of Fig. 12, ballot #1 is in the position it occupies when the first voter has left the booth and in this position the choices the first voter made are recorded on the ballot in the left portion thereof headed "Choice number" in Fig. 13. During the next operation of the machine, the ballot is advanced to present the right hand section thereof to the preset data recording section which records on each ballot the data, such as the date, the location of the voting area, and the number of the machine. This is recorded on each ballot. Thereafter, the ballot advances toward the final receptacle and the knife 96 severs it from the strip.

Candidate wheel readout mechanism

Secured to each of the candidate wheels 24 (Figs. 8 and 9) is a pair of readout cams 116 and 117. In line with each cam 116 is an arm 116a and in line with each cam 117 is an arm 117a, which arms normally occupy the dotted line position shown in Fig. 9 during the time the voter is adjusting the position of the wheel. Each of the wheels 24 is arranged to take any one of sixty different positions in each of which a different combination of the steps 118 on the cams 116, 117 are set on the vertical diameter of the wheel.

Figure 9:
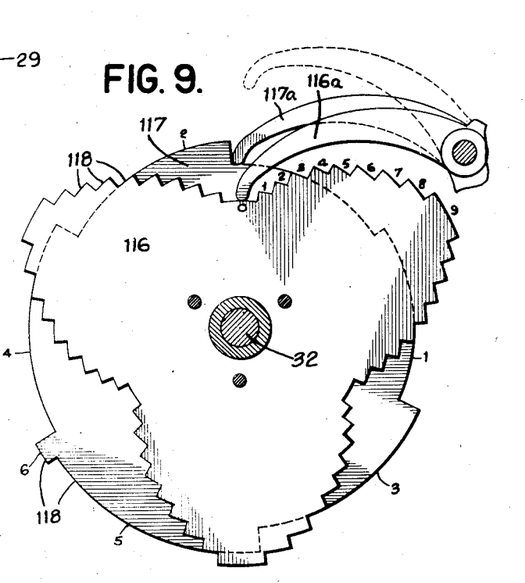
Fig. 9 is a section taken along the lines 9—9 of Fig. 8.

After the wheels are set, the arms 116a and 117a are moved counterclockwise, as will be explained, until the extremities of the arms are interrupted by the steps presented. In Fig. 9, the cams are set at non-selecting or zero position so that both arms move their maximum amount.

Referring to Fig. 4, each arm 116a and 117a is loosely carried on the shaft 119 and held in position along this shaft by a comb 120. For the lower set of wheels the arms 116a and 117a are mounted on a shaft 121 (see also Fig. 6). At their extremities the shafts 119 and 121 carry arms 122 and 123 respectively with pin and slot connections 124 between the two so that rocking of one shaft will be accompanied by corresponding rocking of the companion shaft.

Figures 16, 17:
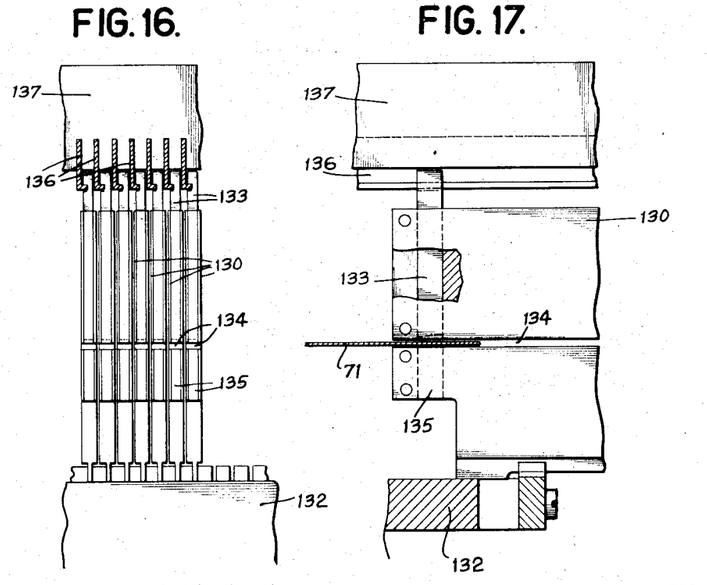
Fig. 16 is a section looking in the direction of lines 16—16 of Fig. 4 showing the arrangement of the ballot marking devices.
Fig. 17 is an enlarged view of the end of one of the ballot marking or punching slides.

Each arm 116a and 117a has secured thereto a Bowden wire 125 (Fig. 4) which is guided in a tube 126 supported by cross bars 127 and 128. The opposite end of each wire terminates in a hook 129 secured to a slide 130. There is a slide 130 for each of the arms 116a and a similar slide for each of the arms 117a. Thus, for the thirty wheels 24 there are sixty slides 130. Each slide 130 is guided for horizontal movement in cross bar 131 (Fig. 4) and a slotted plate 132 (see Figs. 16 and 17) and it has mounted in its forward end a punch 133. The slide 130 is bifurcated as at 134 to straddle the ballot strip 71 so that the punch travels over the upper surface of the strip while the die portion 135 moves across the lower position. The punch 133 is slotted at its upper end to engage an angle 136 carried by crosshead 137. Each slide 130 is provided with a spring 138 (Fig. 4) which will draw the slide toward the left to differentially position the punch 133 across the face of the strip in accordance with the setting of the corresponding candidate wheel. The sequence of operations is as follows:

During the rotation of the main operating shaft 58 a cam 139 (Figs. 1 and 6) will engage follower arm 140 on a rod 141 causing counterclockwise movement of an arm 142 which has pin and slot connection 143 with a member 144 secured to the shaft 121. The member 144 has pin and slot connection with a similar member 145 secured to the shaft 119. Member 144 supports a cross rod 146 (see Fig. 4) and member 145 supports a cross bar 147 which extend across the backs of the lower set of arms 116a, 117a (Fig. 4) and the upper set respectively. As the rods 146 and 147 move away from the feeler arms, the springs 138 will move the slides 130 toward the left (as viewed in Fig. 4) drawing with them the wires 125 and rocking the arms 116a, 117a until the arms engage the steps on the stepped cams to interrupt further movement of the slides. In this manner, the slides are differentially positioned in accordance with the setting of the candidate wheels.

For each candidate position there is assigned a number and if a wheel is positioned (let us say, for example, the candidate wheel associated with the position for choice #1 is set to represent 14) the two slides connected to this wheel will be set so that one of the slides is in position to effect a perforation in the "1" position of the tens column of choice #1 and the units slide is set to perforate a hole in the "4" position of the units column of choice #1, (see Fig. 13). This setting of a pair of slides for each wheel takes place concurrently in all positions.

In those positions in which no candidate selection is made, the two slides will advance to punch a "0" in each column. After all the slides are set, the cross-head 137 is moved downwardly to force the punches 133 through the ballot strip at the positions in which they are set. The operation of the crosshead is effected as follows:

In Fig. 3, the crosshead is shown as being mounted for vertical reciprocation and normally held in its upper position by springs 150. At each extremity the crosshead straddles a rod 151 carried by arms on rods 152 which are tied together for concurrent action by pin and slot connected arms 153. The left hand rod 152 carries an arm 154 in engagement with an arm 155 secured to the cross shaft 99. Thus, as shaft 99 is rocked counterclockwise, as explained, to depress the knife 96, arm 155 will cause clockwise rotation of arm 154 and incidental depression of crosshead 137 through the connections described.

To the left of the slides 130, which are set under control of the candidate wheels, is a group of slides designated 130a. These slides have no connection with the candidate wheels and are differentially positioned by any suitable manual means, such as by a hook shown at 156 in Fig. 4, by means of which the slides may be differentially positioned to represent the data printed on the right hand portion of the ballot of Fig. 13, that is, the day, month, year, etc. This group of slides 130a having been positioned will maintain such relative setting through the continued operation of the machine and when the crosshead 137 descends, the punches carried by these slides will perforate the ballot in the same manner that the candidate wheel controlled slides 138. Each of the slides 130 (Fig. 4) is provided with a set of notches 160 along its lower edge. Extending across beneath the notches is a bar 161 which is pivoted at 162 to an extension 163 of an arm 164. At 162 the extension 163 has connection with another bar 165 pivoted at 166 which forms a toggle with the bar 161. A cam 167 carried by shaft 58 upon rotation will cause counterclockwise rotation of arm 164 and will raise bar 161 into engagement with the lower edges of the slides 131, causing the bar to engage in the notches 160 to effect accurate alinement of the slides before the crosshead descends.

*Resetting the candidate wheels*

Each of the candidate wheels 24 is provided with a ring of gear teeth 170 (Fig. 4) and a cutout portion 171 formed in the plane of the teeth. When the wheels are at restored or blank position, these cut-out portions lie along the horizontal diameter of the wheels. Extending across the back of the wheels are fluted rods 172 whose flutes are cut to mesh with the gear teeth 170. The shafts 172 are carried by arms 173 loose on shafts 119 and 121. The shaft 121 has loosely pivoted thereon an arm 174, coextensive with the lower arm 173 (Figs. 4 and 6) whose free end cooperates with a cam 175 on shaft 58. As the cam 175 rotates, it will permit spring 176 to cause the fluted shafts 172 to rock into engagement with the gear teeth 170. The lower arm 173 extends upward for pin and slot engagement with the depending upper arm 173. Thus, as arm 174 and lower arm 173 are rocked counterclockwise as viewed in Fig. 4 to engage lower shaft 172 with lower wheels 170, the upper arm 173 through the pin and slot connection is rocked clockwise to engage its shaft 172 with upper wheels 170. During this time the shafts 172 are in rapid rotation and any candidate wheels which are displaced from home position will be picked up and restored to the home position.

The means for rotating the shafts 172 comprises pulleys 177 mounted on the ends of the shafts and idler pulleys 178 (Fig. 1) around which a belt 179 extends to a pulley 180 carried on the shaft 66 which rotates as long as the motor 63 is in operation.

Modification

Figure 19:
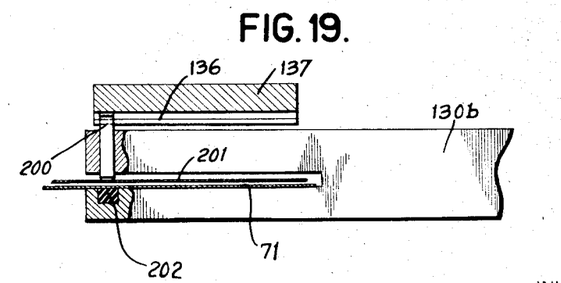
Fig. 19 is a view showing a modified form of ballot marking device.

In Fig. 19 is shown a modified form of marking device whereby instead of punching the selected number, a mark is printed on the ballot. The slide 130b carries a tape or impression plunger 200 which is differentially set in the same manner as the punch 133. In line with plunger 200 is a platen 202 and above the ballot is located an ink ribbon or web 201. Thus, when crosshead 137 descends, the plunger 200 is forced against the ribbon 201 and strip 71 to make a mark in the selected position.

Recapitulation

The entire operation of the machine will now be explained to set forth the coordination of the several units of the device. To place the machine in readiness, the ballot strip 71 is first threaded around the rollers 72 and 74 (Fig. 3), through the "write-in" and marking stations into the bite of feed rollers 76. It will, of course, be understood that the portion to the left of the "write-in" station is wasted and serves simply as a leader.

The voter, on entering the voting booth, closes the curtain behind himself by shifting lever 43 whereupon the clutch tripping latch 53 moves from the position of Fig. 14 to that of Fig. 15 bypassing the tooth on arm 54. He then turns the gears 28 to rotate the candidate wheels 24 until the names of the candidates he has selected appear in the openings 26. For example, the number 1 wheel is rotated until the name for first choice appears, the number 2 wheel is rotated until the name for second choice appears and so on. In accordance with the capacity shown, all thirty wheels may be set to select thirty candidates in order of preference. If the voter desires to designate only, say, five choices he sets only five wheels, leaving the remainder undisturbed.

Where the voter wishes to record a vote for a candidate whose name is not printed on a wheel, he may "write in" such name at the "write-in" station designating at the same time whether such is his first, second, or other order of choice.

Having set the wheels, which setting he may, of course, alter upon reconsideration, the voter draws aside the curtain and leaves the booth. Operating lever 43 trips the one-revolution clutch, releasing the main operating shaft 58 for one revolution and feed rollers 76 advance the ballot strip 71 to bring the ballot from the "write-in" station to the marking station. As the strip 71 advances, the printing roller 77 prepares a subsequent ballot.

Concurrently with the advance of the strip, feeler fingers 116a and 117a are released and slides 130 advance under control of the feelers until the latter contact the positioned stepped cams 116 and 117. The aligning bar 161 then effects accurate alignment before the crosshead 137 descends to perforate the ballot. After the crosshead has returned, bails 147 and 146 restore the feelers and slides and fluted shafts 172 which are in rotation move into engagement with gear teeth 170 to restore the wheels to zero. Those wheels 24 which have not been displaced are not disturbed.

The machine is now in readiness for the next voter to set his selections on the wheels 24 and following his exit from the booth the first voter's ballot advances to position to receive the preset data while the second ballot receives the settable data. After the third voter has made his exit, the first ballot is severed from the strip and ejected into the receptacle 106.

After the last voter has left the booth, the election officials manipulate lever 43 twice to advance the last effective ballot through the machine into the receptacle which can then be removed from the machine and transferred to the place for tabulating the complete results of the votes cast.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a voting machine, a candidate representing wheel having a plurality of rotative positions, one for each of a plurality of candidates, a stationary disc, coaxial with said wheel, a member carried by the wheel and normally engageable with the disc to restrain the wheel in any of its rotative positions, manually operable means, means controlled thereby to move said member out of engagement with the wheel and move the wheel to any of its rotative positions, to select a candidate, means for sensing the position to which the wheel is manually set, recording means controlled thereby in accordance with said setting, and resetting means for said wheel comprising further means for rotating said wheel, said member coacting with said manually operable means to effect disengagement of said member from said disc during rotation of the wheel by said further means.

2. The invention set forth in claim 1 in which said means controlled by the manually operable means is arranged to effect rotation of the wheel in either direction and to cause movement of said member out of engagement with the disc upon rotation in either direction.

3. The invention set forth in claim 1 in which said disc is provided with notches, one for each rotative position of the wheel and said member is provided with resilient means effective when the wheel is in any of its rotative positions to urge the member into the corresponding notch and effect accurate alignment between the wheel and disc.

4. The invention set forth in claim 1 in which said wheel carries an incomplete ring of teeth, and said resetting means comprises a rotating pinion, together with means for moving the pinion into engagement with said ring of teeth whereby the wheel will be rotated until the incomplete section of the ring is adjacent to said pinion.

5. In a voting machine, a candidate wheel settable in any one of a plurality of rotative positions, means for setting the wheel, a cam carried by the wheel, a feeler finger arranged for movement toward said cam to sense the position of said wheel, a marking device mounted for reciprocation, a Bowden wire connection between said finger and said device, means for moving said device in one direction to draw said wire and finger therewith until the finger engages the cam, means for operating said marking device to record in accordance with the position to which it is moved and means for positively moving said finger away from the cam whereby said wire will be drawn in the opposite direction to restore the marking device and means, operative after the marking device is moved in said one direction and before said marking device is operated to record, to effect a slight reverse movement of said marking device.

6. In a machine of the class described, a candidate selecting wheel, a stationary axle upon which the wheel is rotatable, a notched wheel secured to said axle and having a number of notches about its periphery, one for each rotative position of the wheel, a pair of members pivoted to the wheel, an arm of each forming a toggle, a roller carried by the toggle and a spring normally urging the roller into engagement with one of said notches to hold the wheel in position, an arm pivoted on said axle and engaging said pair of members, and manual means for rotating said arm in either direction to rock said members and therethrough rotate the wheel to another of its rotative positions, the member first disengaging said roller from the disc, and said spring causing the roller to reengage the disc upon completion of the rotation of said arm to hold the wheel in its further rotative position.

7. The invention set forth in claim 6 in which further means is provided to rotate said wheel directly, to cause the members thereon to rotate said arm, said members first disengaging said roller from the disc and said spring causing the roller to reengage the disc upon completion of the rotation of the wheel by said further means.

FRED M. CARROLL.